(12) United States Patent
Lin

(10) Patent No.: US 7,925,720 B2
(45) Date of Patent: Apr. 12, 2011

(54) METHOD FOR MONITORING A REMOTE MACHINE

(75) Inventor: Yi-Hsin Lin, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 172 days.

(21) Appl. No.: 12/365,308

(22) Filed: Feb. 4, 2009

(65) Prior Publication Data

US 2010/0198962 A1 Aug. 5, 2010

(51) Int. Cl.
*G06F 13/00* (2006.01)
(52) U.S. Cl. .................... 709/219; 709/225; 709/227
(58) Field of Classification Search .................. 709/204, 709/206, 217, 219, 227, 228, 229
See application file for complete search history.

(56) References Cited

U.S. PATENT DOCUMENTS

| 7,392,309 | B2 * | 6/2008 | Childers et al. | 709/224 |
| 7,580,990 | B1 * | 8/2009 | Spring | 709/219 |
| 2007/0185969 | A1 * | 8/2007 | Davis | 709/216 |
| 2009/0241143 | A1 * | 9/2009 | White et al. | 725/38 |

* cited by examiner

*Primary Examiner* — Viet Vu
(74) *Attorney, Agent, or Firm* — Chun-Ming Shih; HDLS IPR Services

(57) ABSTRACT

A method used for monitoring a remote machine by a local computer via a computer network. The remote machine is installed with web server programs and has parameter settings reconfigured by updating an Electronic Data Sheet. The method comprises initiating a browser at the local computer and establishing the computer network link to the remote machine via the computer network; downloading a JAVA applet from the remote machine to the local computer; and accessing an Electronic Data Sheet corresponding to the remote machine with the JAVA applet stored in the local computer and displaying the content of the Electronic Data Sheet at the local computer.

6 Claims, 2 Drawing Sheets

METHOD FOR MONITORING A REMOTE MACHINE

BACKGROUND OF THE INVENTION

1. Field of the Invention

The present invention generally relates to a method for monitoring a remote machine, in particular, to a method for updating an Electronic Data Sheet corresponding to a remote machine stored in a local computer and reconfiguring parameter settings of the remote machine via a computer network.

2. Description of Prior Art

Electronic Data Sheet (also abbreviated as EDS) is a prior art general format used for recording various internal parameter settings of a remote machine, such as remote machine model numbers, remote machine firmware version numbers, remote machine product categories etc . . . . Accordingly, users may access the EDS of remote machine to retrieve various internal parameter settings of the remote machine. Similarly, various internal parameter settings of the remote machine can be reconfigured by updating the EDS of remote machine.

FIG. 1 is a schematic view of a prior art method using Electronic Data Sheet to control a remote machine. A local computer 10A is installed with a browser 12A. The browser 12A can be a known application such as an Internet Explorer or Firefox etc. A remote machine 20A has the EDS 22A of the remote machine 20A. The EDS 22A of the remote machine 20A has the parameter settings of the remote machine 20A. The local computer 10A is electrically coupled to the remote machine 20A. The local computer 10A initiates a browser 12A and establishes an internet link to the remote machine 20A to access the EDS 22A of the remote machine 20A for retrieving various internal parameter settings of the remote machine 20A. By the method above, the local computer 10A monitors the operations of the remote machine 20A. When the remote machine 20A is a motor or a sensor, the local computer 10A utilizes the method to accurately monitor the operations of the remote machine 20A and perform tasks or parameter measurements.

FIG. 2 is a flow chart of a prior art method using Electronic Data Sheet to control a remote machine to further illustrate the operations performed in the FIG. 1 in details. With reference to FIG. 1 and FIG. 2, at first the local computer 10A initiates the browser 12A at step S10 and establishes the computer network link to the remote machine 20A. At the following step S20, the local computer 10A accesses to the EDS 22A of the remote machine 20A stored in the machine 20A and displays the content of the EDS 22A of the remote machine 20A at the local computer 10A for retrieving the parameter settings of the remote machine 20A.

However, the biggest challenge of the prior art method is that the EDS 22A of the remote machine 20A is stored in the remote machine 20A instead of the local computer 10A. According to the prior art method, it is only allowed to initiate the browser 12A at the local computer 10A and establish the computer network link to the remote machine 20A to access the EDS 22A of the remote machine 20A stored in the remote machine 20A and to display the content of the EDS 22A of the remote machine 20A. Consequently, the prior art method only provides means for retrieving the parameter settings of the remote machine 20A and does not provide means for reconfiguring the parameter settings of the remote machine 20A. Therefore, when a remote machine requires maintenance upon machine failure or an update on the machine firmware, users are not allowed to perform maintenance or firmware updates on a computer network. Users have to send the remote machine back to the manufacturer or utilize other complicated means for maintenance or firmware updates. The overall process is inconvenient as well as time and labor consuming.

SUMMARY OF THE INVENTION

Therefore, in order to overcome the above mentioned disadvantages of the prior art, it is an object of the present invention to provide a method for monitoring a remote machine which allows a user to reconfigure and maintain various internal parameter settings of a remote machine.

In order to achieve the goal of the above, the method for monitoring a remote machine according to the present invention uses a local computer to monitor a remote machine via a computer network. The remote machine is installed with web server programs and has various internal parameter settings reconfigured by updating an Electronic Data Sheet. The method comprises following steps: initiating a browser at the local computer and establishing the computer network link to the remote machine via the computer network; downloading a JAVA applet from the remote machine to the local computer; and accessing an Electronic Data Sheet corresponding to the remote machine with the JAVA applet stored in the local computer and displaying the content of the Electronic Data Sheet at the local computer.

Further, the method further reconfigures various internal parameter settings of the remote machine by updating the EDS of remote machine according to the present invention.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 3:
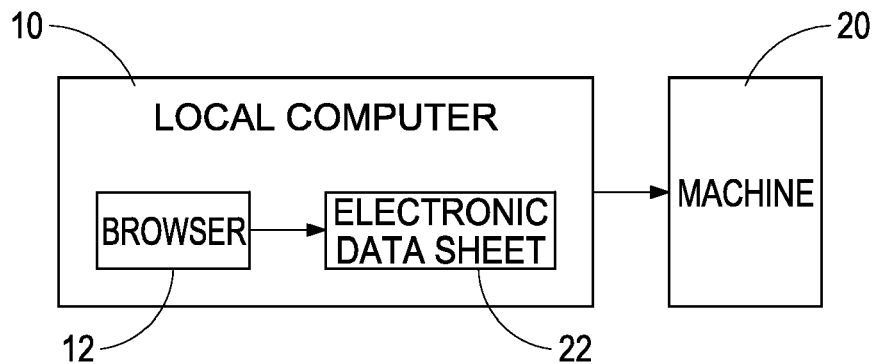
FIG. 3 is a schematic view of a system using the method for monitoring a remote machine according to the present invention.

FIG. 3 is a schematic view of a system using the method for monitoring a remote machine according to the present invention. A local computer 10 is installed with a browser 12. The browser 12 can be a prior art browser such as Internet Explore or Firefox. The local computer 10 is operatively coupled to a remote machine 20 via a computer network (such as an Ethernet network). The remote machine 20 is installed with a web server Program (not shown in the diagrams). The local computer 10 further comprises EDS 22 of the remote machine 20. The EDS 22 of the remote machine 20 has the internal parameter settings of the remote machine 20, such as remote machine model numbers, machine firmware version numbers or machine product categories etc. The local computer 10 initiates the browser 12 and establishes the computer network link to the remote machine 20, then downloads the JAVA applet of the remote machine 20 from the remote machine 20 to the local computer 10. JAVA applet is a kind of program language developed by Sun Microsystems dedicating for internet network use. JAVA is an object-oriented program language used in the content of world wide web (WWW) with characteristics such as cross platform, easy to implement, interpreted-type language and object-oriented.

According to the present invention, the JAVA applet of the remote machine 20 has the corresponding address information of the EDS 22 stored in the local computer 10. Thus, the local computer 10 accesses the EDS 22 corresponding to the remote machine 20 stored in the local computer 10 via JAVA applet of the remote machine 20, and displays the content of the EDS 22 of the remote machine 20 for retrieving various internal parameter settings of the remote machine 20. In addition, users are allowed to update the content of the EDS 22 of the remote machine 20 to reconfigure various internal parameter settings of the remote machine 20.

Further, the content of the EDS 22 according to the present invention is exemplified as the following, wherein the remote machine is a converter (VFD):

[File]
DescText="DN-02E EDS File";
CreateDate=Aug. 19, 2008;
CreateTime=10:06:20;
ModDate=Aug. 19, 2008;
ModTime=10:06:20;
Revision=1.00;
[Device]
VendCode=799;
VendName="DELTA ELECTRONIC, INC.";
ProdType=12;
ProdTypeStr="Communications Adapter";
ProdCode=22;
MajRev=1;
MinRev=1;
ProdName="Delta VFD-E";
Catalog="Delta VFD-E Drive DeviceNet communication module";
[Params]

Figure 1:
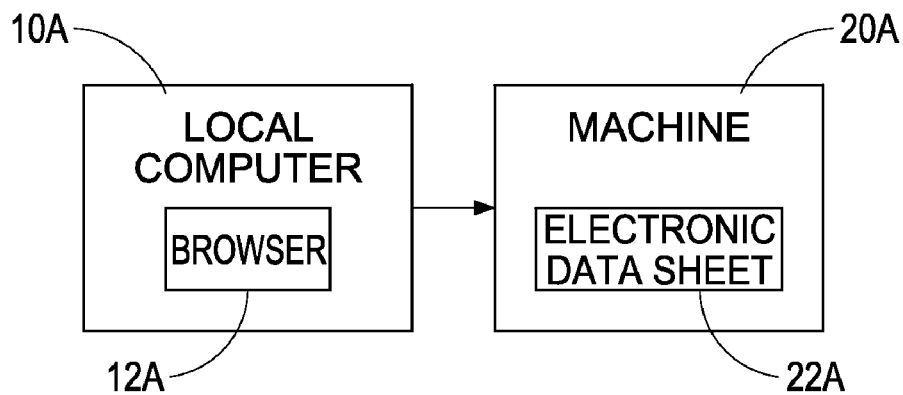
FIG. 1 is a schematic view of a prior art method using Electronic Data Sheet to control a remote machine.
Figure 2:
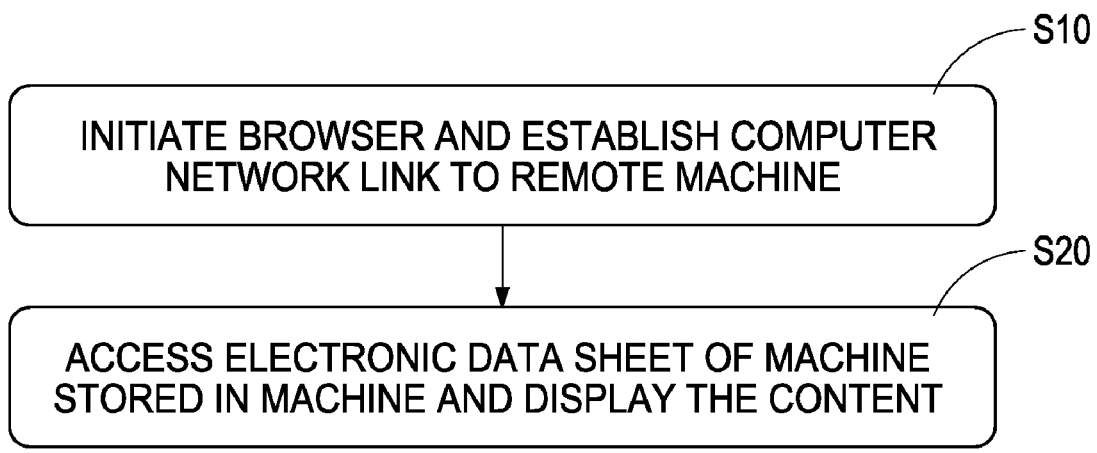
FIG. 2 is a flow chart of a prior art method using Electronic Data Sheet to control a remote machine.

According to the contrast drawn between the methods used in FIG. 1 and FIG. 3, the biggest difference between the method for monitoring a remote machine according to the present invention and prior art is the stored location of the EDS 22 of the remote machine 20. The EDS 22 of the remote machine 20 according to the prior art is stored in the remote machine 20. Users can access to but cannot update the EDS 22 of the remote machine 20. The EDS 22 of the remote machine 20 according to the method for monitoring a remote machine of the present invention is stored in the local computer 10. With JAVA applet technology, users can access and update the content of the EDS 22 of the remote machine 20 to reconfigure various internal parameter settings of the remote machine 20.

Figure 4:
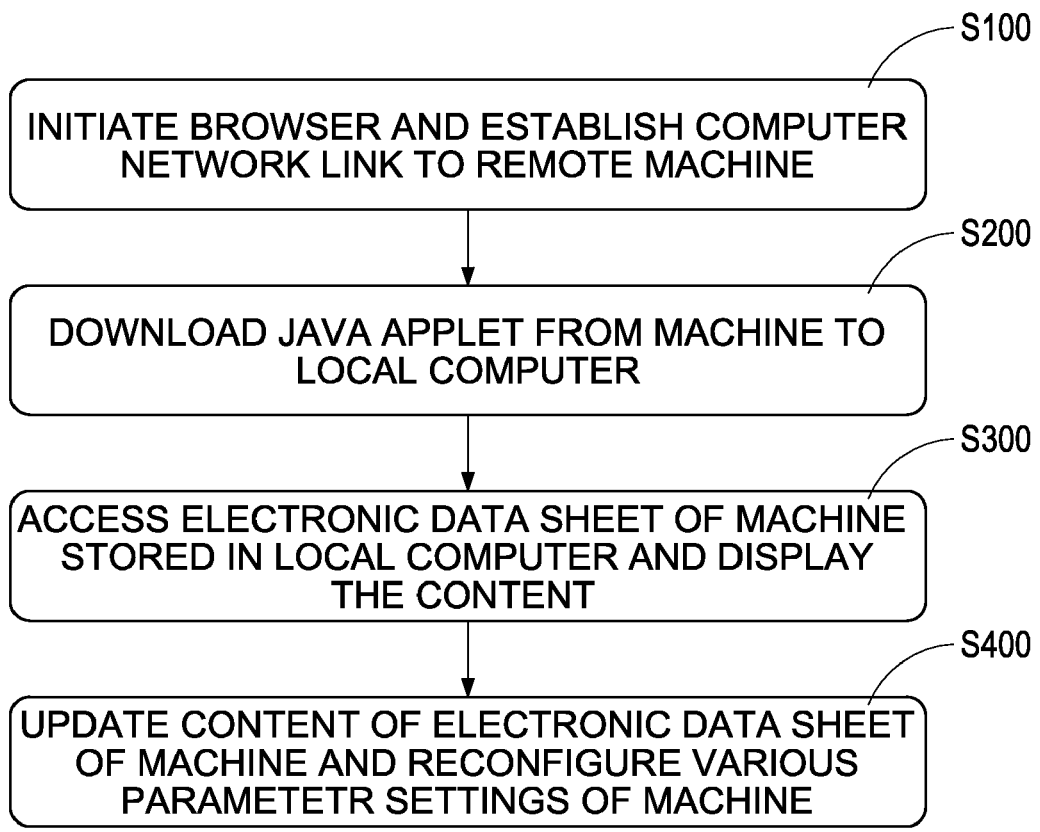
FIG. 4 is a flow chart of the method for monitoring a remote machine according to the present invention.

FIG. 4 is a flow chart of the method for monitoring a remote machine according to the present invention. Firstly, at step S100, the local computer 10 initiates the browser 12 and establishes a computer network link to the remote machine 20. Following that, at step S200, the remote machine 20 downloads the JAVA applet of the remote machine 20 to the local computer 10. Then, the JAVA applet of the remote machine 20 at the local computer 10 accesses the EDS 22 corresponding to the remote machine 20 stored in the local computer 10, and displays the content of the EDS 22 of the remote machine 20 to retrieve various internal parameter settings of the remote machine 20, such as remote machine model numbers, machine firmware version numbers or machine product categories etc . . . . Lastly, at step S400, the JAVA applet of the remote machine 20 at the local computer 10 updates the content of the EDS 22 of the remote machine 20 so as to reconfigure various internal parameter settings of the remote machine 20.

The differences shown from the contrast between prior art and the method for monitoring a remote machine according to the present invention are demonstrated in the FIG. 3 and FIG. 4. The method for monitoring a remote machine according to the present invention utilizes technology of JAVA applet to download JAVA applet of the remote machine 20 from the remote machine 20 to the local computer 10, to access the EDS 22 of the remote machine 20 stored in the local computer 10, and to display the content of the EDS 22 of the remote machine 20 so as to retrieve various internal parameter settings of the remote machine 20. In addition, the JAVA applet updates the content of the EDS 22 of the remote machine 20 at the local computer 10 to reconfigure various internal parameter settings of the remote machine 20.

As the skilled person will appreciate, various changes and modifications can be made to the described embodiments. It is intended to include all such variations, modifications and equivalents which fall within the scope of the invention, as defined in the accompanying claims.

What is claimed is:

1. A method for monitoring a remote machine by a local computer via a computer network, the remote machine being installed with web server programs and having parameter settings reconfigured by updating an Electronic Data Sheet, the method comprising:
    A) installing an Electronic Data Sheet of said remote machine at said local computer;
    B) initiating a browser at said local computer and establishing said computer network link to said remote machine via said computer network;
    C) downloading a JAVA applet from said remote machine to said local computer to access said Electronic Data Sheet of said remote machine which is installed at said local computer; and
    D) accessing said Electronic Data Sheet of said remote machine via said JAVA applet and displaying a content of said Electronic Data Sheet of said remote machine at said local computer.

2. The method of claim 1, wherein the method further comprises a step E) updating content of said Electronic Data Sheet corresponding to said machine to reconfigure said parameter settings of said machine.

3. The method of claim 2, wherein said browsers are Internet Explorer or Firefox.

4. The method of claim 2, wherein said parameter settings are machine model numbers, machine firmware version numbers or machine product categories.

5. The method of claim 1, wherein said computer network is an Ethernet network.

6. The method of claim 1, wherein said remote machine is a converter.

* * * * *